(12) United States Patent
Brzezowski

(10) Patent No.: US 8,694,163 B2
(45) Date of Patent: Apr. 8, 2014

(54) SYSTEM AND METHOD FOR MANAGING RESOURCE SUSTAINABILITY PERFORMANCE

(75) Inventor: Edward H. Brzezowski, Bedminster, NJ (US)

(73) Assignee: Noveda Technologies, Inc., Branchburg, NJ (US)

( * ) Notice: Subject to any disclaimer, the term of this patent is extended or adjusted under 35 U.S.C. 154(b) by 958 days.

(21) Appl. No.: 12/822,450

(22) Filed: Jun. 24, 2010

(65) Prior Publication Data

US 2011/0320054 A1 Dec. 29, 2011

(51) Int. Cl.
*G05B 13/00* (2006.01)
*G05D 3/12* (2006.01)
*G06F 17/40* (2006.01)
*G06Q 10/00* (2012.01)

(52) U.S. Cl.
USPC ........... 700/275; 700/291; 702/182; 702/187; 705/7.12; 705/7.22

(58) Field of Classification Search
None
See application file for complete search history.

(56) References Cited

U.S. PATENT DOCUMENTS

| | | | |
|---|---|---|---|
| 6,169,964 B1 | 1/2001 | Aisa et al. | |
| 6,226,600 B1 | 5/2001 | Rodenberg, III et al. | |
| 7,069,161 B2 | 6/2006 | Gristina et al. | |
| 7,545,265 B2 | 6/2009 | Fang | |
| 7,616,663 B1 | 11/2009 | Elliott | |
| 7,668,671 B1 | 2/2010 | Gristina | |
| 2007/0143046 A1 | 6/2007 | Budike | |
| 2008/0172282 A1* | 7/2008 | McNeill et al. | 705/9 |
| 2008/0306985 A1 | 12/2008 | Murray et al. | |
| 2009/0088991 A1 | 4/2009 | Brzezowski et al. | |
| 2009/0307178 A1 | 12/2009 | Kuhns et al. | |
| 2010/0076615 A1 | 3/2010 | Daniel et al. | |
| 2011/0289019 A1* | 11/2011 | Radloff et al. | 705/412 |

FOREIGN PATENT DOCUMENTS

WO    WO 2009/104164    *  8/2009    ............. G06F 19/00

* cited by examiner

*Primary Examiner* — Sean Shechtman
(74) *Attorney, Agent, or Firm* — Lerner, David, Littenberg, Krumholz & Mentlik, LLP

(57) ABSTRACT

Resource sustainability performance of a facility is managed using real time resource monitoring data, and resource sustainability performance values for the facility determined using the real time monitoring data are provided in real time. In addition, resource sustainability feedback information is distributed in real time to cause a resource sustainability action to be executed in connection with the facility. The feedback information is determined from sustainability result information, which is determined from real time resource sustainability action information and the real time resource performance values determined for the facility.

34 Claims, 11 Drawing Sheets

FIG. 6
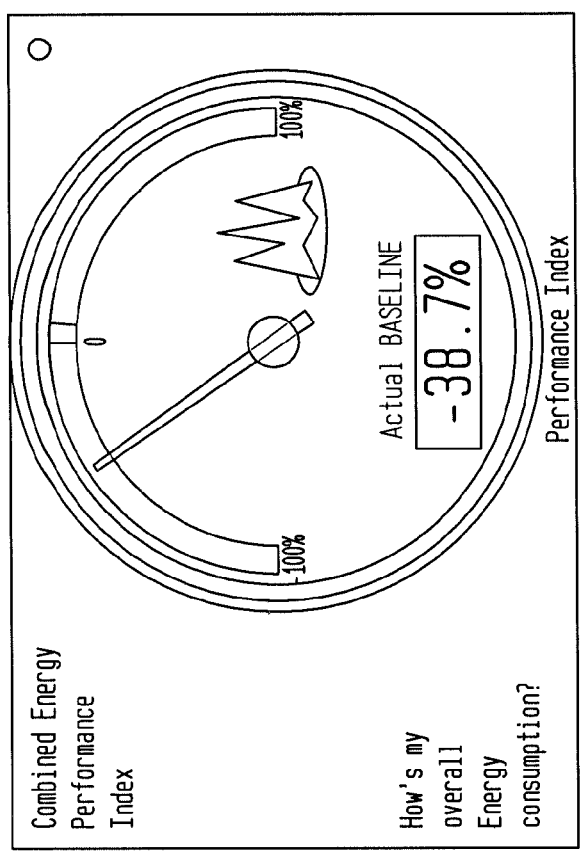
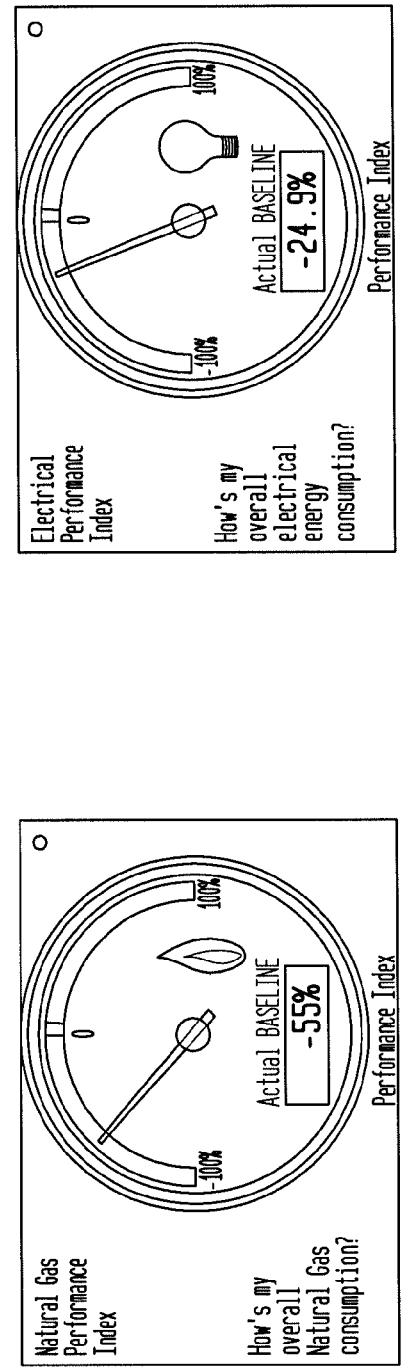

SYSTEM AND METHOD FOR MANAGING RESOURCE SUSTAINABILITY PERFORMANCE

BACKGROUND OF THE INVENTION

It has been recognized that energy is the common link across all fields in science, technology, engineering, mathematics, education and research. Virtually every discipline investigates some aspect of energy, including history, humanities, public policy, global relations, human and ecosystem health, economics, technology, physics, geology, ecology, business management, environmental science and engineering. The concept of energy applies at all levels of formal education and lifelong learning, and includes many topics and tools that motivate successful learning.

Although there is a wealth of information about energy spread across many books, journals, websites and disciplines, the information is not logically connected to provide a meaningful resource that may be easily accessed and used in efforts to reduce energy usage and, ultimately, attain net zero energy operations or energy sustainability.

In addition, information needed to attain energy sustainability for a residential or commercial building typically is not provided in real time and in a useful manner. For example, utility bills for a commercial enterprise that operates an office building usually arrive 30-45 days after energy is consumed, after which the bill is paid by an accounts payable department and then filed away. Energy usage, and the results of any efforts to reduce energy consumption, typically are not known or evaluated other than once a year, such as when a budget is prepared for the following year or an energy audit is performed. In most cases, only a few people associated with the commercial enterprise are made aware of the amount of energy usage by the enterprise. The owner of the enterprise, thus, may learn only after energy usage has occurred that energy usage may have changed significantly. By such time, it is too late to act to change energy usage and, thus, the overall energy consumption behavior of the facility. Furthermore, increased energy usage for a prior year may impact the overall budget for the enterprise for the next year, for example, by causing reduced expenditures for building maintenance and capital improvements that may reduce energy consumption. Although an energy audit may be obtained and renewable energy funding from state or federal agencies may be available, budgetary constraints resulting from increased energy usage in the prior year often cause the owner of the enterprise to not take actions to reduce energy usage that involve additional expenditures. Consequently, energy consumption, and also the carbon footprint of the enterprise, typically increase from year to year for the enterprise.

Further, the energy consumption information provided by a utility typically is complex and in a raw form, which makes evaluation of the energy consumption information a very difficult, tedious and error prone process. As a result, energy consumption is not evaluated in real time, such that actions cannot be taken to change energy consumption behavior in real time, for example, before the next monthly utility bill is received.

In addition, guidance on actions that may be taken to reduce the environmental impact resulting from energy usage is not readily available. Commercial buildings are the largest source of $CO_2$ emissions, and efforts are underway to reduce these emissions by the private and public sectors. Typical efforts to reduce emissions use monthly utility bills, and the data from the bills is entered manually and then analyzed on a periodic basis during the year. Notably, the information is available only after the energy has been consumed and billed by the utility company.

More recently, real time energy meters, such as real time power meters, that make energy consumption information available in real time, have been installed in many buildings. The energy consumption information, although provided in real time, still typically is in the form of charts, graphs and reports that, like the energy consumption information in monthly utility bills, requires time and the use of specialized skills and knowledge of energy specialists to interpret and understand. In addition, although some real time power meters may provide information on a display showing power usage in real time, complicated and time consuming interpretation of the displayed information, similar to that required to understand the energy information provided in tabular or chart form, must be performed to determine what actions should be taken, in view of the displayed energy usage. The availability of real time energy consumption information, thus, has not meaningfully impacted efforts to attain energy sustainability.

It is believed that investment in energy management can have a positive impact on reducing expenses and stimulating the economy through the development of jobs and expertise in the local energy services industry. The general unavailability of guidance on what actions should be taken to attain energy sustainability, however, has resulted in efforts to attain energy sustainability being unsuccessful, and sometimes abandoned when the lack of success is coupled with costly investment in actions with little success in return.

Therefore, there exists a need for system and method to manage resource sustainability performance of a facility and provide sustainability feedback information in real time to cause actions to be taken in real time to attain resource sustainability at a facility.

SUMMARY OF THE INVENTION

In accordance with an aspect of the present invention, a method for managing resource sustainability performance of a facility may include receiving, over a communication network, real time monitoring data for the facility. The monitoring data may include real time resource monitoring data and facility operations monitoring data. In addition, the method may include determining, by a processing unit, a target resource usage value for the facility in relation to a baseline resource usage value for the facility, using resource usage information for the facility; and providing, by the processor unit, display data for displaying a real time resource sustainability performance value for the facility determined in relation to the baseline resource usage value and using the real time monitoring data. In addition, the method may include providing, by the processor unit, real time resource sustainability feedback information to cause a resource sustainability action to be executed in connection with the facility. The real time resource sustainability feedback information may be determined from resource sustainability result information. The resource sustainability result information may be determined from real time resource sustainability action information and the real time resource performance value for the facility.

In accordance with another aspect of the present invention, an apparatus for managing resource sustainability performance of a facility may include a receiver unit that may receive, over a communication network, real time monitoring data for the facility. The monitoring data may include real time resource monitoring data and facility operations monitoring data. In addition, the apparatus may include a resource sustainability unit adapted to determine a target resource usage value for the facility in relation to a baseline resource usage value for the facility using resource usage information for the facility. In addition, the resource sustainability unit may be adapted to provide display data for displaying a real time resource sustainability performance value for the facility determined in relation to the baseline resource usage value and using the real time monitoring data; and to provide real time resource sustainability feedback information indicating a resource sustainability action for the facility. The real time resource sustainability feedback information may be determined from resource sustainability result information. The resource sustainability result information may be determined from real time resource sustainability action information and the real time resource performance value for the facility.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which:

FIG. 6 is an illustration of an exemplary display of energy sustainability performance information for a facility, in accordance with an aspect of the present invention.

DETAILED DESCRIPTION

Figure 1:
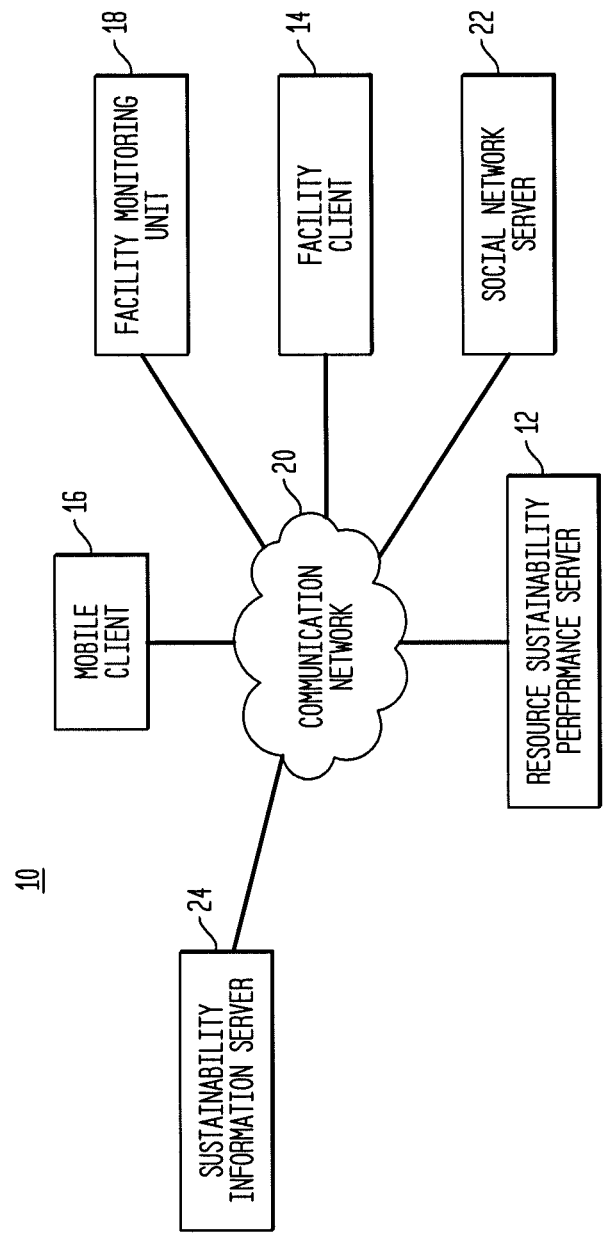
FIG. 1 is a block diagram of an exemplary system, in accordance with an aspect of the present invention.

FIG. 1 is an exemplary system 10 for managing resource sustainability performance of a facility, in accordance with an aspect of the present invention. The monitored resource may be any metered resource including electricity, gas, oil, water, steam, chilled water, hot water, etc. Referring to FIG. 1, the system 10 may include a resource sustainability performance server 12, a facility client 14, a mobile client 16 and a facility monitoring unit 18. Each of the server 12 and clients 14 and 16, for purposes of the exemplary illustrated embodiment, is a computer, has communication capabilities and may be communicatively coupled to a communications network 20. The network 20 is any wired or wireless communications network, such as the Internet, a WLAN, a LAN, etc. The resource monitoring unit 18, which may include a processor, has communication capabilities and may be communicatively coupled to the communications network 20.

In addition, the system 10 may include a server 22 providing a social networking website, and a sustainability information server 24, each having communication capabilities. As discussed in detail below, the server 12 may transmit to and receive from the servers 22, 24, over the network 20, information related to executing a process of managing resource sustainability performance of a facility, in accordance with an aspect of the invention.

It is to be understood that a "facility" for which a process to manage resource sustainability performance, in accordance with aspects of the invention, may be performed may include any defined space or region of a structure, such as a room or floor of a commercial or residential building; a building; spaces within one or more buildings; a plurality of buildings; any combination of spaces within respective buildings; or a site or land location having some form of capital improvement.

Figure 2:
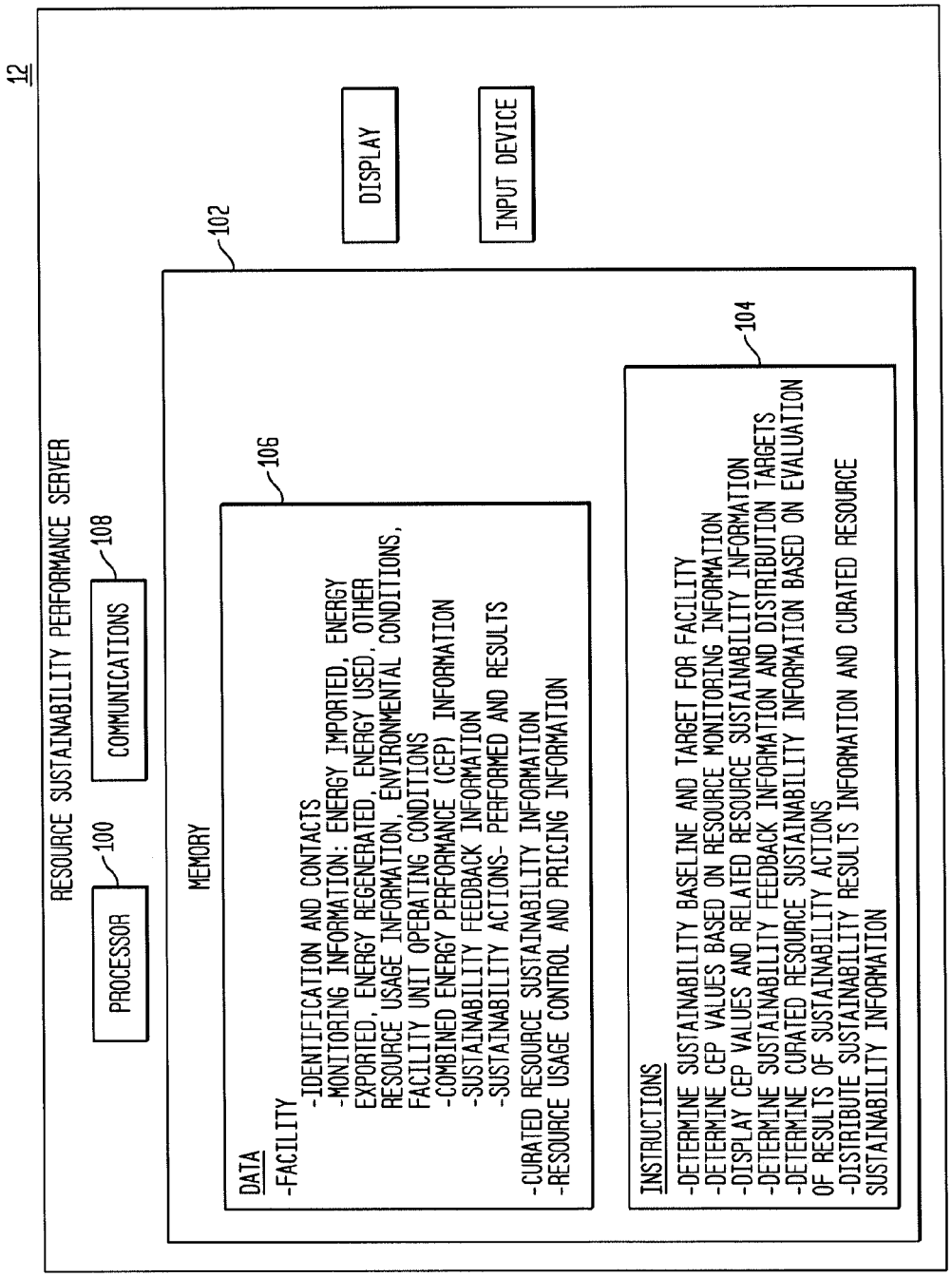
FIG. 2 is a block diagram of an exemplary resource sustainability performance server, in accordance with an aspect of the present invention.

Referring to FIG. 2, in one exemplary embodiment, the server 12 may include a processor 100, a memory 102, a communications network interface device 108 and other components typically present in a general purpose computer.

The memory 102 stores information accessible by the processor 100, including instructions 104 that may be executed by the processor 100. The memory 102 also includes data 106 that may be retrieved, manipulated or stored by the processor 104. The memory 102 may be of any type capable of storing information accessible by the processor, such as a hard-drive, memory card, ROM, RAM, DVD, CD-ROM, write-capable, read-only memories, etc.

The processor 100 may be any well-known processor, such as processors from Intel Corporation or AMD. Alternatively, the processor may be a dedicated controller such as an ASIC.

The instructions 104 may be any set of instructions to be executed directly (such as machine code) or indirectly (such as scripts) by the processor 100. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 106 may be retrieved, stored or modified by the processor 100 in accordance with the instructions 104. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 2 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read only computer chip. Some or all of the instructions and data may be stored in a location physically remote from, yet still accessible by, the processor. Similarly, the processor may actually comprise a collection of processors which may or may not operate in parallel.

The communications network interface device 108 is capable of establishing wired or wireless communication links with other devices over a communication network, such as the network 20.

Referring to FIG. 2, the data 106 in the server 12 may include resource sustainability information specific to a facility, for which a process to manage resource sustainability performance of a facility that includes providing sustainability feedback information to attain net zero resource operation ("resource sustainability") at the facility is performed by the server 12. For example, the data 106 may include identification information for the facility including an address, a telephone number, a fax number and an email address of each individual ("stakeholder") who can take action or cause action to be taken to attain resource sustainability for the facility. In addition, the identification information may include details on the internal and external structural features of the facility and their layout in relation to geographic coordinates.

Also, the data 106 may include monitoring information for the facility, such as historical and real time data concerning consumption of a monitored resource at the facility. For example, the data 106 may include historical and real time data relating to import of energy, export of energy, consumption of energy including overall consumption or consumption by individual energy consuming devices ("appliances") of the facility, and regeneration of energy by or on behalf of the facility, such as by renewable energy generation sources, such as solar, wind, geo-thermal, etc., renewable energy generators. Also, the data 106 may include historical and real time data relating to consumption, usage and regeneration of other resources, such as water, and desirably chilled water, steam and hot water. Further, the data 106 may include historical and real time data relating to environmental conditions at or near the facility, such as temperature, humidity, etc. Also, the data 106 may include historical and real time data relating to operating status and condition of one or more of the appliances of the facility, such as an air conditioning and heating ventilation unit, boiler, etc. The monitoring data may be of the type, may be acquired using sensors and other monitoring meters, and may be communicated over a communication network, such as described in U.S. Patent Pub. No. 2009/0088991 ("'991 application"), incorporated by reference herein and assigned to the assignee of this application.

Further, the data 106 may include information used to determine a resource performance index for the facility, and to determine resource performance values for the facility in real time in relation to the resource performance index. In an exemplary embodiment, the resource performance index may be a combined energy performance ("CEP") index determined using historical energy monitoring data for the facility relating to consumption of imported energy, such as supplied by a natural gas or electric power utility, and consumption of regenerated energy of the facility; a baseline CEP value determined from the historical energy monitoring data and which corresponds to an amount of energy consumed by the facility over a predetermined time period, such as one year; and a target CEP value determined using the baseline CEP value and the CEP index. The target CEP value may correspond to net zero energy operation at the facility. In alternative embodiments, the target CEP value may correspond to energy sustainability performance below or above net zero energy operation. In addition, the data 106 may include real time CEP values, which are determined in real time using real time energy monitoring data for the facility, such as provided by the facility monitoring unit 18.

The data 106 also may include sustainability feedback information determined as part of the inventive process of managing resource sustainability performance of a facility; information indicating to whom or what entity, apparatus or device, such as the servers 22, 24 or the clients 14, 16 (collectively "distribution targets"), particular feedback information can be distributed; information indicating the distribution target(s) to which feedback information is provided and when the feedback information is provided; sustainability action information indicating whether a resource sustainability action is taken, how the action is taken, and who or what device or apparatus takes the action; and resource sustainability performance values, such as CEP values, and monitored conditions at the facility before and after a sustainability action is taken. The monitored conditions, for example, may include environmental conditions, such as temperature, availability of sunlight, humidity, etc; and operating status of appliances of the facility.

In addition, the data 106 may include information categorizing or indexing sustainability actions taken in response to sustainability feedback information provided by the server 12, and indicating the extent of success of the actions taken according to a success determination. The success of the actions may be determined, for example, based on a change in the CEP value in relation to a prior CEP value or to a range of CEP values containing the prior CEP value. The success determination also may use a grading scale associated with the CEP index to determine the extent of success of the action.

Further, the data 106 may include curated resource sustainability information ("curated RSI") generated by the server 12. The curated RSI generated by the server 12 indicates a sustainability action taken responsive to feedback information provided by the server 12, and where the result of the action is determined by the server 12 to satisfy success criteria. The curated RSI desirably includes the feedback information provided to cause execution of a sustainability action; characteristics of the individual, entity, device and/or apparatus, such as a resource control apparatus for automatically controlling energy usage by an appliance as described in the '991 application, to which the feedback information was distributed; the sustainability action taken, the results of the action and the individual, entity and/or apparatus that executed the action or caused the action to be taken; and resource performance values and monitored conditions for the facility before and after the sustainability action is taken. The curated RSI may be retrieved by the processor 100, as suitable, to determine feedback information that may be distributed to cause a sustainability action to be taken at a facility.

In a desired embodiment, the data 106 may also include curated RSI generated external to the server 12 and acquired from other sustainability information sources, such as the servers 22, 24.

In addition, the data 106 may include information relating to restrictions on use of resources issued by resource suppliers, such as utility companies, and also resource cost information. For example, the resource usage restriction information may include real time demand/response requests and regenerated energy supply requests received from an electric utility or a smart grid operator. The resource cost information may include real time energy tariff pricing data, carbon offset or credit pricing data and like resource-related cost and market price information.

The instructions 104 in the server 12 may include instructions that the processor 100 may execute to determine a baseline resource usage value and a target resource usage value, such as a target CEP value, using historical and real time resource usage information for the facility. Further, the instructions 104 may include instructions that the processor 100 may execute to determine a resource performance index, such as the CEP index, for the facility using a baseline resource usage value, such as the baseline energy usage value, determined from historical energy monitoring data in the memory 102. The determination of the CEP index, for example, may be based on facility specific data indicating import and regeneration of energy during a predetermined time period, such as one year.

The instructions 104 further may include instructions that the processor 100 may execute to determine a real time CEP value using real time energy monitoring data, such as provided by the facility monitoring unit 18. In addition, the instructions may include instructions that the processor 100 may execute to control display of real time CEP values for a facility on a dashboard display, desirably with other information relating to resource usage or regeneration for the facility. Energy or other resource sustainability information, including resource sustainability performance values, may be displayed in the form of a dashboard display, such as described in the '991 application, incorporated by reference herein.

The instructions 104 also may include instructions that the processor 100 may execute to determine sustainability feedback information that may be provided for a facility. The sustainability feedback information may be obtained from curated RSI generated at the server 12, and as well as curated RSI acquired from external sources.

Also, the instructions 104 may include instructions that the processor 100 may execute to determine the distribution target, for example, an individual, entity and/or resource control apparatus, to which to distribute feedback information, based on information included in the curated SRI. The distribution target, for example, may be an operator of appliances of the facility or a person responsible for implementing an energy sustainability plan for the facility.

Further, the instructions 104 may include instructions that the processor 100 may execute to evaluate the results of a sustainability action taken at a facility responsive to feedback information provided by the server 12, and determine whether the action succeeded in improving resource sustainability performance of the facility, such as energy sustainability performance, and also the extent of the success of the action. For example, the determination of success of the sustainability action may be performed in relation to the CEP index for the facility, use real time monitoring information of energy consumption at the facility to determine real time CEP values, and compare the real time CEP values following the action with the CEP values before the sustainability action was taken.

In addition, the instructions 104 may include instructions that the processor 100 may execute to generate curated RSI that may be used in the future to provide resource sustainability feedback information for a facility. The instructions desirably include determining whether a sustainability action taken responsive to particular feedback information satisfies predetermined success criteria, and if yes storing information relating to the sustainability action taken in the data 106 as curated RSI.

Also, the instructions 104 may include instructions that the processor 100 may execute to determine to whom and how to distribute in real time the evaluated results of the sustainability action executed for the facility, and also the curated RSI generated at the server 12. In one embodiment, the evaluated results and the curated RSI may be distributed, for example, to the mobile client 16, which is desirably used by an operator of facility appliances who was a distribution target for the feedback information. In an alternative embodiment, the evaluated results and the curated RSI may be provided to the client 14, which is desirably associated with or used by an individual responsible for implementation of an energy sustainability plan for the facility. The evaluated results may be transmitted with real time CEP values and also real time energy consumption data, such as received from a real time power meter, to provide further information regarding a change in energy usage resulting from an energy sustainability action executed at the facility.

In another embodiment, the evaluated results and the curated RSI generated at the server 12 may be distributed to online social networks, such as by transmission to the social network server 22 over a communication network, and desirably to groups interested in resource sustainability organized on online social networks hosted by the server 22. In addition, the curated RSI generated at the server 12 may be distributed to the server 24.

In one embodiment, the server 12 may distribute one or more of the evaluated results, feedback information and curated RSI it generates to the clients 14, 16 using podcasting services.

Figure 3:
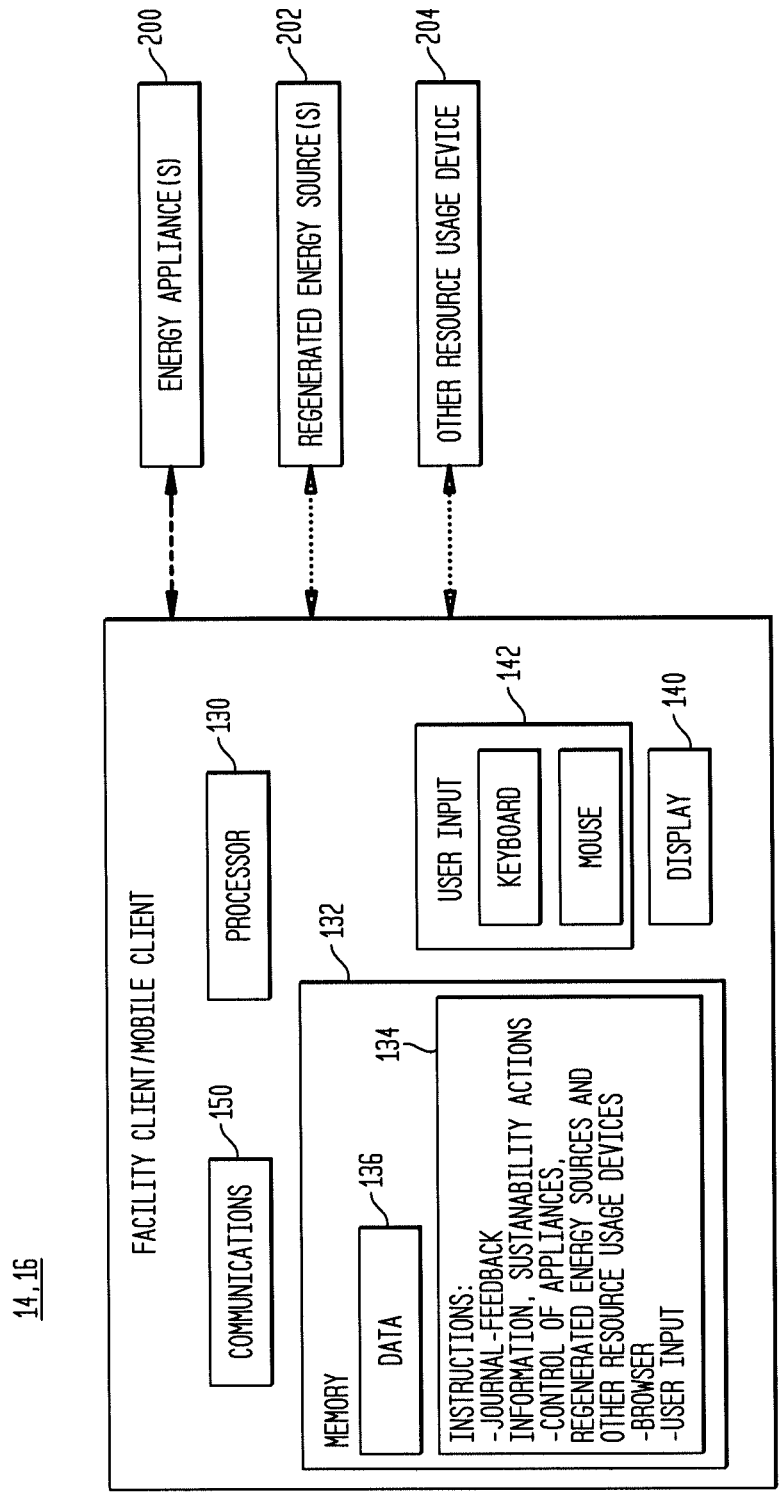
FIG. 3 is a block diagram of an exemplary client, in accordance with an aspect of the present invention.

Referring to FIG. 3, the facility client 14 and the mobile client 16 may be configured similarly as the server 12, with a processor 130 and a memory 132 containing instructions 134 and data 136. For example, the clients 14, 16 (collectively "client") may be a personal computer, intended for use by a person, having all of the internal components normally found in a personal computer, such as a central processing unit (CPU), a display device 140 (for example, a monitor having a screen, a projector, a touch-screen, a small LCD screen, a television, or another device such as an electrical device that is operable to display information processed by the processor), CD ROM, hard drive, a user input 142, such as a mouse, keyboard, touch screen or microphone, speakers, and a communications network interface device 150 and all of the components used for connecting these elements to one another.

The user input 142, for example, may serve as an interface that enables a human ("operator") to control operation of appliances 200 of the facility; regenerated energy sources 202 of the facility; and other resource usage devices 204, such as a water chiller or a boiler. The user input 142 also may be used to provide that the operating status of the appliances 200, the sources 202 and the resource usage devices 204 is displayed on the display 140. Also, the display 140 may be controlled by input supplied at the user input 142 to display sustainability resource performance information for the facility provided by the server 12, such as over the network 20.

The instructions 134 of the client may include instructions that the processor 130 may execute to enable the operator to enter, using the user input 142, any information relating to resource sustainability efforts for the facility, such as sustainability actions taken by the operator, and have such information stored in a digital log in the data 136 of the memory 132. The instructions 134 also may provide that the data 136 of the digital log is automatically communicated to and stored at the server 12. In a desired embodiment, the digital log may also be automatically updated by the server 12 to include, for a specific facility, real time CEP values, the CEP index, the feedback information distributed and sustainability actions taken and their results, such as changes in CEP values. The sustainability information for the facility in the digital log may be accessed from the server 12, such as by an operator of the client 14 or 16, at any time.

The instructions 134 of the client may include instructions that the processor 130 may execute to provide a browser functionality, such as to enable the operator of the client to access social network websites on the server 22 or a website hosted by the server 12 on which a dashboard display of CEP values and other resource sustainability information is displayed.

It is to be understood that, although the server 12 or the clients 14, 16 may comprise a full-sized personal computer, the system and method may also be used in connection with mobile devices capable of wirelessly exchanging data with a server over a network such as the Internet. For example, the clients may be a wireless-enabled PDA such as a Blackberry phone, I-Phone or an Internet-capable cellular phone.

In one embodiment, the client may perform the same or similar operations of a process for managing resource sustainability performance as performed by the server 12, such that the data 136 contains the same or similar data as stored in the data 106 and the instructions 134 include the same or similar instructions as stored in the instructions 104.

Referring again to FIG. 1, the server 22 may provide a social networking website, such as FACEBOOK, MYSPACE or TWITTER or the like, accessible by registered or non-registered users.

In addition, the sustainability information server 24 may include a processor and memory, such as described for the server 12, and the memory may contain a database of resource sustainability information, including curated RSI, that may be accessed and updated remotely over the communication network 20. In one embodiment, the database of the server 24 may be accessed and updated automatically by the server 12 based on the evaluation of results of sustainability actions by the server 12, and desirably when new curated RSI is generated by the server 12. For example, the sustainability information server 24 may be updated by the server 12 to store sustainability information resulting from and relating to energy sustainability actions recommended or taken at a facility to attain energy sustainability. The database of the server 24 further may include data logs of sustainability actions taken at various facilities in response to feedback information, and the conditions and circumstances under which the actions were taken and the extent of success, desirably with success gradings. In addition, the database of the server 24 may be accessed over the communication network by any individual interested in resource sustainability, such as by using communication devices similar to the client 16.

Figure 4:
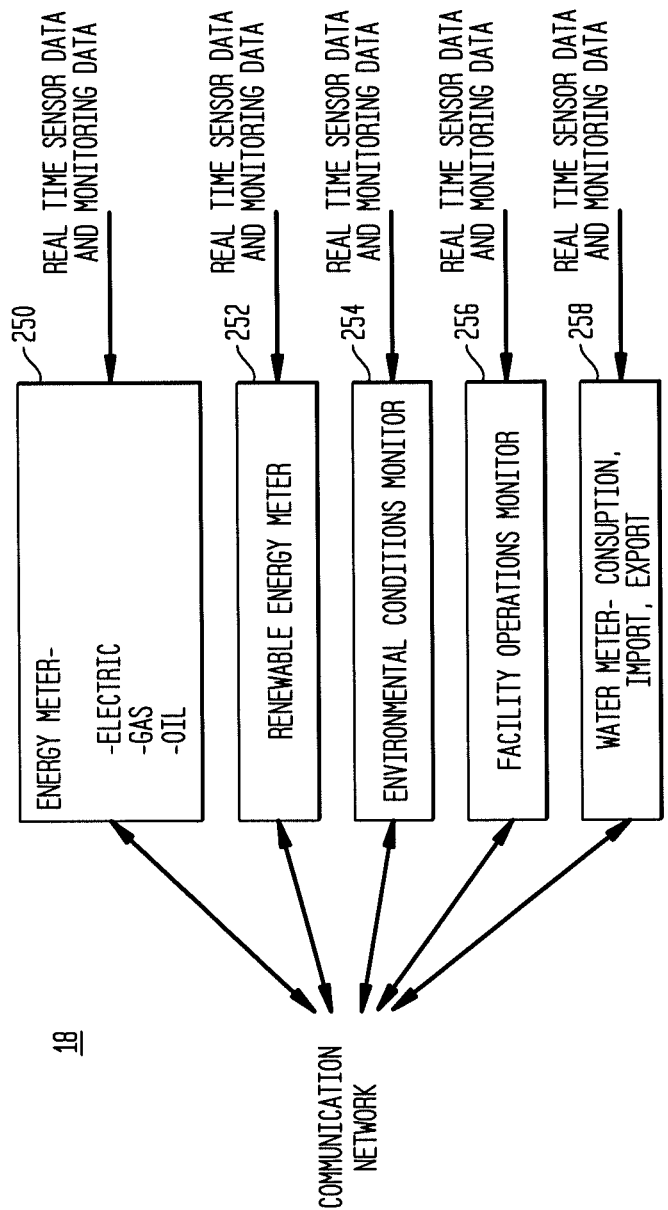
FIG. 4 is an exemplary facility monitoring unit, in accordance with an aspect of the present invention.

Referring to FIG. 4, the facility monitoring unit 18 may include one or more of an energy consumption meter 250, a renewable energy generation meter 252, an environmental conditions monitor 254, a facility operations monitor 256 and other resource monitor(s) 258, such as a water meter. The meter and the monitors of the monitoring unit 18 may receive real time sensor and monitoring data, and each desirably includes communications capabilities for communicating such data, in real time, to the server 12 and the clients 14, 16. The construction and operation of the meters and monitors of the unit 18 to provide for communication of real time resource, environmental and facility operating condition monitoring information, and of sensors and other monitoring devices that provide to the meters and monitors 250, 252, 254, 256, 258 real time data relating to, for example, operation of appliances and energy regeneration sources and environmental conditions relevant to attaining resource sustainability of the facility, may be of the type described in application '991, incorporated by reference herein.

In accordance with an aspect of the present invention, resource sustainability performance of a facility may be managed so as to provide real time sustainability feedback information to attain resource sustainability for the facility. The managing may include using real time monitoring information for the facility and curated RSI to determine in real time the resource sustainability feedback information to be provided, distributing the feedback information in real time, determining in real time success of a sustainability action taken responsive to the feedback information, and distributing in real time sustainability results information relating to the sustainability action taken. In addition, the sustainability results information may be used to generate new curated RSI, which in turn may be used with existing curated RSI to determine sustainability feedback information for the facility, and which also may be distributed over a communication network to enable use of the new curated RSI to attain resource sustainability at another facility.

Figure 5:
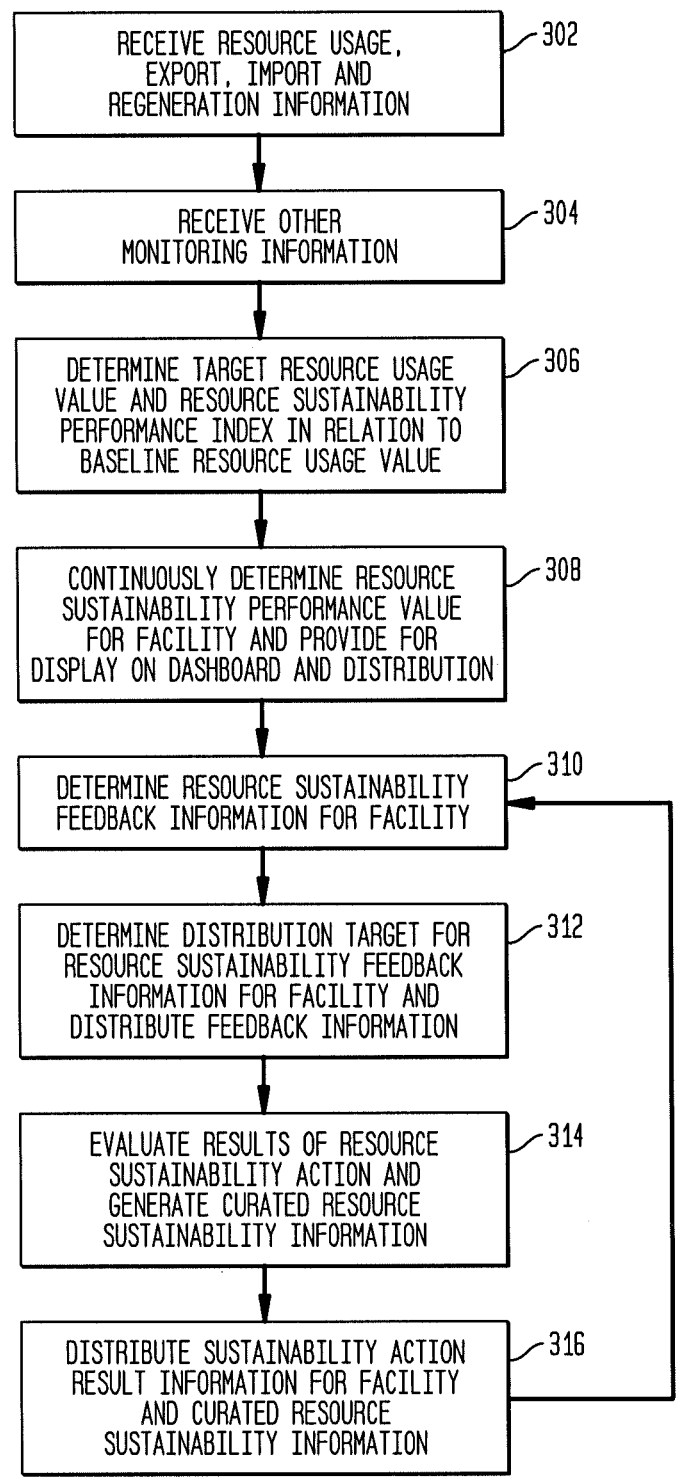
FIG. 5 is a flow diagram of an exemplary process, in accordance with an aspect of the present invention.

For purposes of highlighting features of the present invention, an exemplary process 300 for managing resource sustainability performance of a facility, as shown in FIG. 5, is described below in connection with operations performed at components of the system 10, as described in FIGS. 1-4. Although the invention is described below with the server 12 performing substantially all of the processing to execute a process of managing energy sustainability performance of a facility, it is to be understood that the some or all of the operations performed at the server 12 may be performed at the client 14, and some or all of the operations performed at the client 14 may be performed at the server 12. In addition, the invention is described below with reference to FIGS. 6-9, which illustrate exemplary dashboard displays that may be provided as part of the inventive process of managing energy sustainability performance of a facility.

Referring to FIG. 1-5, in block 302, the processor 100 may receive real time energy monitoring information from the monitoring unit 18, over the communication network 20. The monitoring information may include real time information of energy usage, export, import and regeneration by the facility, such as described in the '991 application, incorporated by reference herein. Further, the processor 100 in block 302 may receive historical energy consumption and regeneration data for the facility.

In block 304, the processor 100 may receive real time environmental condition and facility operation monitoring information from the monitoring unit 18, over the communication network 20. The environmental condition and facility operation monitoring information, for example, may include the type of information described in the '991 application, incorporated by reference herein. Further, the processor 100 may receive real time demand/response requests and kilowatt-hour pricing schedules from a utility company that supplies electricity to the facility. In block 306, the processor 100 may determine a baseline energy usage value for the facility, which may be associated with a predetermined time interval such as one year, using the historical energy data. Also, the processor 130, based on the baseline usage value, may determine a target energy usage value for a time period in which energy sustainability performance for the facility is managed ("managing period"). The managing period desirably is the same length as the time interval for which the baseline usage value is determined. Also, the processor 100 may determine a combined energy performance ("CEP") index for the facility, based on the baseline usage value. The CEP index may be determined, for example, using information of energy consumption for the facility from all sources of energy for the facility, such as from electric and natural gas utilities and renewable energy generation sources.

For example, the baseline energy usage for a facility may be determined to be 100,000 BTUs for a one year period. The baseline energy usage includes usage of the entirety of 50,000 BTUs generated by a regenerated energy source of the facility during the one year period, and also 50,000 BTUs supplied from a utility company during the same one year period. The CEP index may range from −100% to 100%. A CEP value of −100% may be set as a target CEP value for the facility, and corresponds to a condition where, over the course of a managing period, the facility generates more regenerated energy and consumes less energy supplied by the utility company, such that the energy sustainability performance for the facility is net zero energy operation. To attain net zero energy operation for the facility over the entirety of the managing period, for example, the amount of energy supplied from the utility and the overall amount of energy consumed by the facility may be unchanged during the one year managing period, while the amount of regenerated energy generated during the one year managing period is twice the amount of the energy regenerated in the prior year. The CEP value of 100% corresponds to an energy sustainability performance for the facility in which, for example, twice the amount of energy is used during the one year managing period than in the prior year, without any increase in generation of regenerated energy by the facility.

Referring again to FIG. 5, in block 308, the processor 100 may continuously determine, in real time, CEP values for the facility in relation to the CEP index for the facility, based on the real time energy monitoring information. The real time CEP value is determined to reflect the expected energy consumption over the managing period. In one embodiment, the real time CEP value is determined based on the amount of energy being consumed and the amount energy being regenerated when the real time CEP value is determined, and also on the amount of energy already consumed and the amount of energy already regenerated during the managing period.

Figure 7:
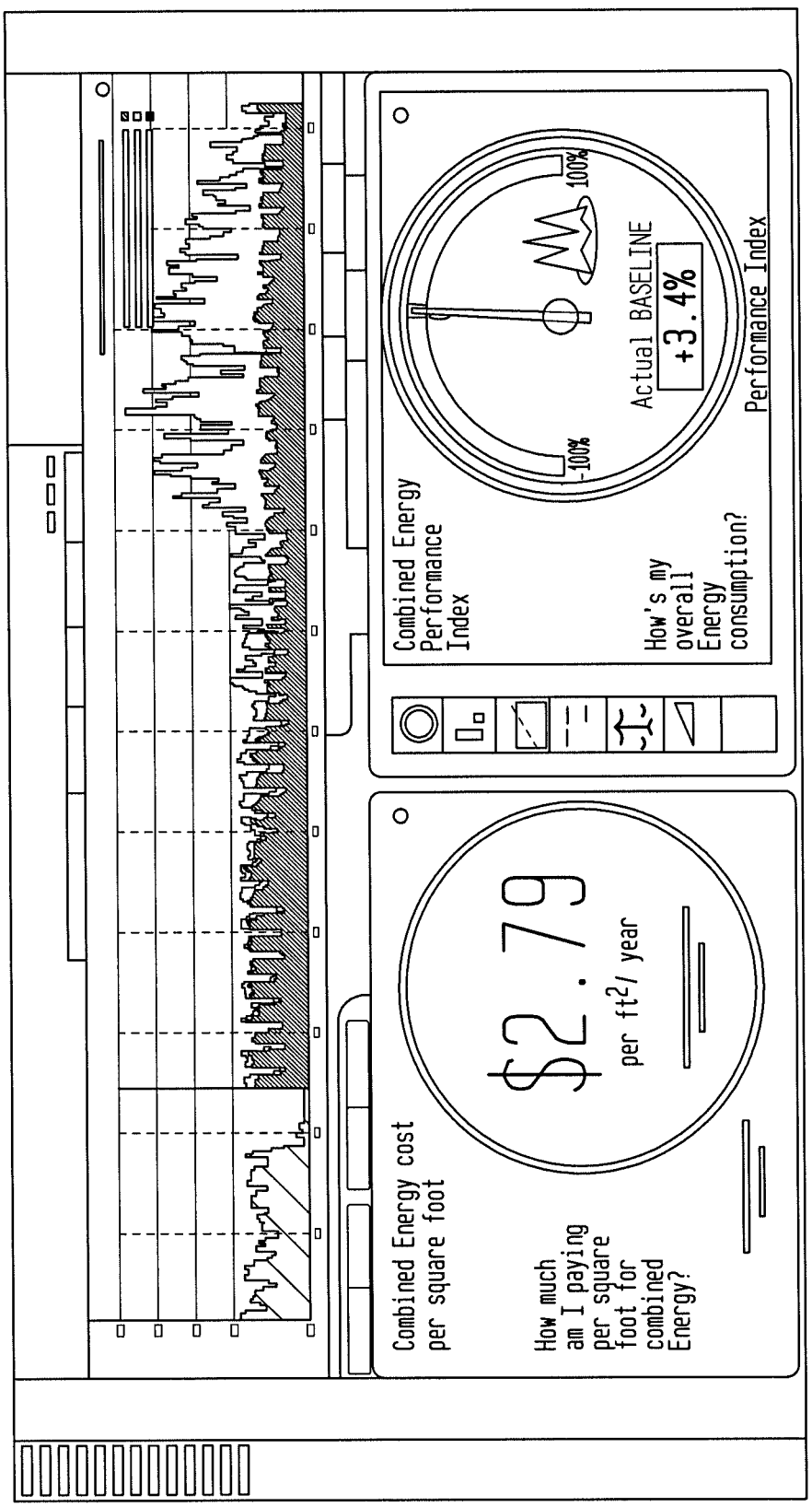
FIG. 7 is an illustration of an exemplary display of energy sustainability performance information for a facility, in accordance with an aspect of the present invention

Further, in block 308 the processor 100 may provide for continuous display of the CEP index, the real time CEP value and other energy related information on a dashboard display, such as shown in FIGS. 6-7. Referring to FIG. 6, in one embodiment, the dashboard display may include a dashboard display for the CEP index showing the real time CEP value, and also dashboard displays of natural gas and electrical performance indexes includes respective real time natural gas and electrical performance values. Desirably, each of the electric and natural gas performance indices have performance values that range between −100%, which corresponds to net zero electricity and natural gas operation at the facility, and 100%, which corresponds to electricity and natural gas sustainability performance at the facility that is 100% worse during the managing period than during the time period from which the baseline electric and natural gas usage values for the facility are determined. Referring to FIG. 6, the display shows that the real time CEP value is −38.7%, which means that the energy sustainability performance of the facility thus far during the managing period is 38.7% better than that for the previous year period. The processor 100 may provide that the dashboard displays are remotely accessible by the clients 14, 16, such as on a website hosted or operated by the server 12.

In block 310, the processor 100 may determine energy sustainability feedback information that may be provided for the facility, using the real time monitoring information of the facility and the current CEP value. The monitoring information, which may impact the feedback information determination, may include real time energy usage and regeneration data, environmental and operations conditions data and real time demand/response requests and pricing information, such as transmitted from an electric utility that supplies electricity to the facility. The feedback information determination desirably is performed using curated SRI, which may be acquired from the sustainability server 24 or is currently stored in the memory 102 of the server 12. The curated SRI is desirably evaluated to identify successful sustainability actions taken at a facility having the same or similar monitoring conditions as the facility whose energy sustainability performance is being monitored, and to identify the characteristics of the distribution target(s) to which the feedback information was provided and which resulted in execution of the successful sustainability action.

As described above, and in desired embodiments, the curated SRI includes information relating to the type of entity, individual, device or apparatus to which the feedback information associated with a sustainability action was distributed. The feedback information desirably is linked to specific distribution target characteristics in the curated SRI to increase the chance of behavior change, and in particular, that a sustainability action recommended by feedback information is taken and such action positively impacts energy sustainability performance at a facility.

In one embodiment, the feedback information of the curated SRI may be associated with such distribution target characteristics as types of personas, the role of the distribution target in implementing sustainability actions, and functional needs for implementing actions, such as making capital adjustments or improvements in a facility or resetting controls on or replacing an old inefficient furnace of a facility with a high efficiency furnace. In addition, a distribution target linked to the feedback information in the curated SRI may be a social networking website, such as a FACEBOOK group including individuals involved in operation and management of appliances of a facility. In another embodiment, the distribution target characteristics may indicate whether the feedback information includes actionable information for monitored resources other than energy, such as chilled water, steam, etc.

In block 312, the processor 100 may determine a distribution target associated with the facility, whose energy sustainability performance is being monitored, to which to distribute the feedback information determined in block 310. Also, in block 312 the processor 102 may distribute the feedback information to a suitable distribution target of the facility. For example, the feedback information may be transmitted as an email or posting on a social network to an individual, such as a technician, of the facility responsible for controlling operation of appliances, such as HVAC and lighting systems, of the facility. The feedback information may include real time energy metering related information, such as information indicating a high level of energy consumption by specific appliances over a recent period, and recommend specific sustainability action(s) to reduce energy consumption by the specific appliances. Also, the sustainability action recommended in the feedback information may include, for example, resetting operating time and parameters of HVAC and lighting systems, such as based on longer daylight hours and scheduled early closings of the facility on alternate Fridays during summer, such that air conditioning thermostats are set at higher levels during those times.

In one embodiment, the processor 100 of the server may provide that feedback information in the form of control data is transmitted, over the communication network 20, directly to a control system included in an appliance of the facility, such as a smart electronic thermostat control of an air conditioning unit. Based on the control data, the control system of the appliance may automatically change or reset operations of the appliance, such as by turning off the appliance during selected hours of the day, to reduce energy usage during those hours.

In one embodiment, a distribution target of the feedback information, such as a technician, may input information in the mobile client 16 assigned to the technician to update a digital journal which stores details of the sustainability action taken by the technician. The information input in the digital journal may be when and how the operator altered the operation of the appliances, optionally using the client 16, based on the feedback information.

In block 314, the processor 100 may evaluate the results of a sustainability action executed responsive to the feedback information. The extent of success of a sustainability action desirably is determined based on change of the CEP value since the sustainability action was taken. The success also desirably is determined in view of monitored conditions of the facility when the action was taken, and the CEP values previously determined for the facility. For example, success may be determined in view of the new CEP value and a range of CEP values in which a previously determined CEP value is contained before the action was taken, and/or the range of CEP values in which the new CEP value is contained following the action, such as within a few days or weeks after the action is executed. In addition, the information indicating when an action is taken, as well as facility and environmental conditions existing before and after an action is taken, may be evaluated as part of a determination of success of the action. The server 12 may provide that information representative of the evaluated results of a sustainability action is distributed to, and also readily accessible on dashboard displays obtainable at, the client 14 or the mobile client 16.

In addition, the processor 100 may categorize or index the sustainability actions in terms of their success in improving energy sustainability performance of the facility. The processor 100 also may generate, based on a determination that results of sustainability actions taken satisfy predetermined success criteria, curated SRI which includes feedback information indicating the successful action taken and also the results of the action.

In one embodiment, when a CEP value before an action is taken is within a predetermined range of CEP values, the evaluation of success may evaluate whether the new CEP value, as determined from the real time energy monitoring data, changed by at least a predetermined amount within the predetermined range. Depending on the result of this evaluation, the processor 100 in block 314 may generate curated SRI to identify the action taken and other related information, such that the same action may be recommended as feedback information for the same facility or another facility having similar CEP values.

In block 316, the processor 100 may determine where and how to distribute the evaluated sustainability action result information and also the curated RSI generated at the server 12, to produce the greatest impact on sustainability efforts for the facility. The distribution of the evaluation result information and the curated RSI, in which sustainability actions are identified and linked to successful results, advantageously may reinforce the motivation and belief of a distribution target that execution of a sustainability action will produce an outcome moving the facility toward net zero energy operation, and further that minor actions, such as turning off a thermostat, may lead and link to macro phenomena, i.e., persistent net zero energy operation at a facility.

Further in block 316, the processor 100 may determine to which social networks to distribute the feedback information and curated SRI generated at the server 12 in real time, to increase awareness about sustainability efforts and also the availability of information for attaining energy sustainability. Those who may benefit from the distribution of sustainability results information and curated SRI created by the server 12 may include building owners, managers and occupants; and architects, engineers, consultants, mechanical and electrical contractors, commissioning agents, service companies, manufacturers, trade and research organizations, education and training institutions, and local, state and federal agencies involved in furthering resource sustainability efforts.

The operations of the blocks 310-316 continue to be performed by the processor 100 during a managing period, such that feedback information may continue to be determined and distributed in real time to improve energy sustainability performance of the facility, and desirably attain net zero energy operation for the managing period. Advantageously, in accordance with the invention, resource sustainability performance of a facility may be managed using real time resource monitoring data, and resource sustainability performance values for the facility determined using the real time monitoring data may be provided in real time. In addition, resource sustainability feedback information may be distributed in real time to cause a resource sustainability action to be executed in connection with the facility. The feedback information may be determined from sustainability result information, which is determined from real time resource sustainability action information and the real time resource performance values determined for the facility.

In one embodiment, results of sustainability actions taken for a facility may be automatically linked to the corresponding actions at the server 12, and may be accessed from a client of the server 12. In a further embodiment, a user may operate the client 16 to access dashboard displays, such as shown in FIGS. 6-7, that show the extent of success of the energy sustainability actions as reflected by real time movement of CEP values, and whether improved energy sustainability performance persisted over time.

Figure 8:
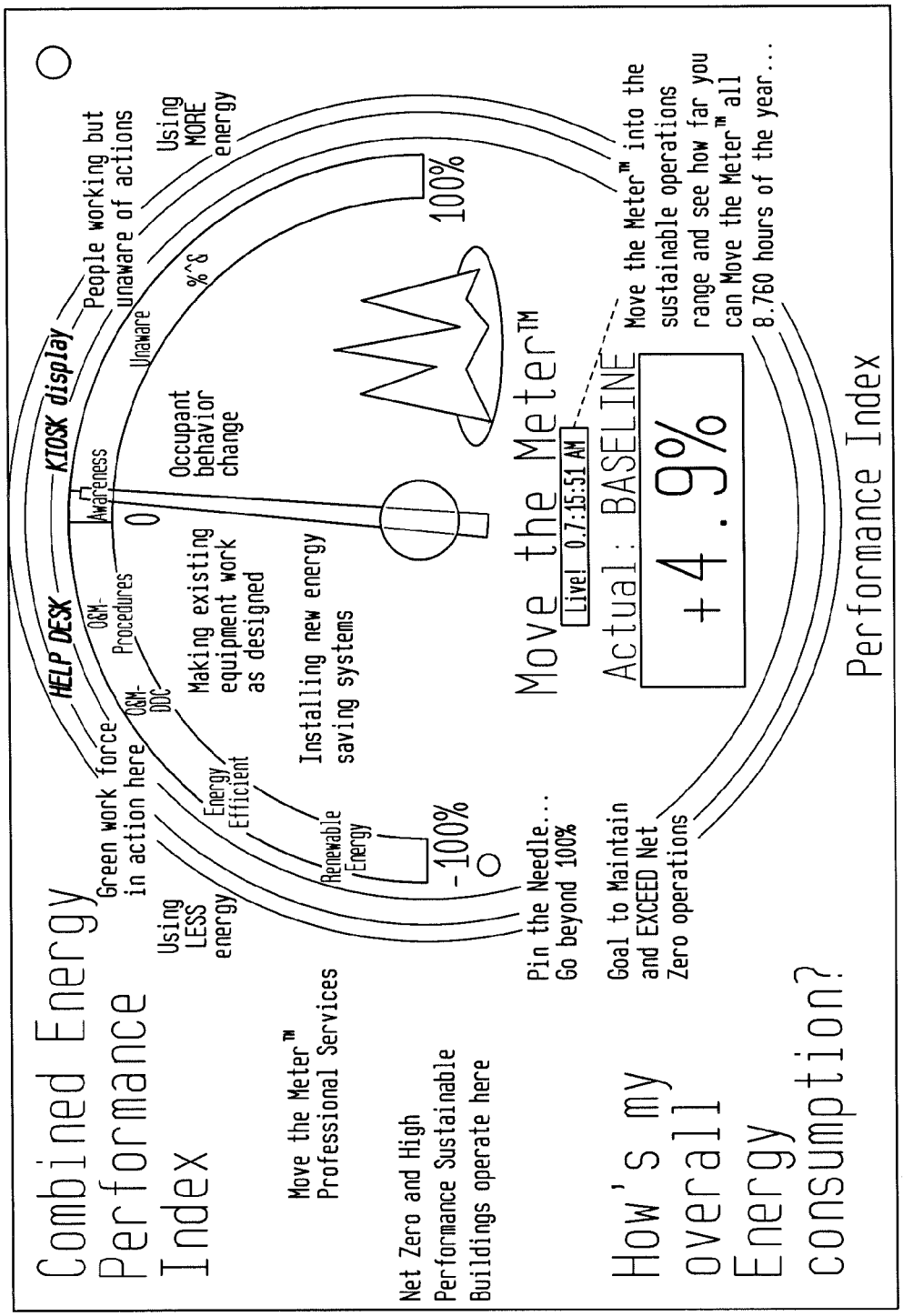
FIG. 8 is an illustration of an exemplary display of energy sustainability performance information for a facility, in accordance with an aspect of the present invention.

In another embodiment, as shown in FIG. 8, the CEP index for a facility may be classified by ranges of CEP values that correspond to predetermined sustainability actions indicated in curated SRI and which were found to lower CEP values when performed while the CEP values were in a particular CEP range. Feedback information may be determined based on the CEP ranges, such as generally shown in FIG. 8. It is to be understood that the dashboard display ordinarily accessible by a client from the server 12 would not include such feedback information.

Figure 10:
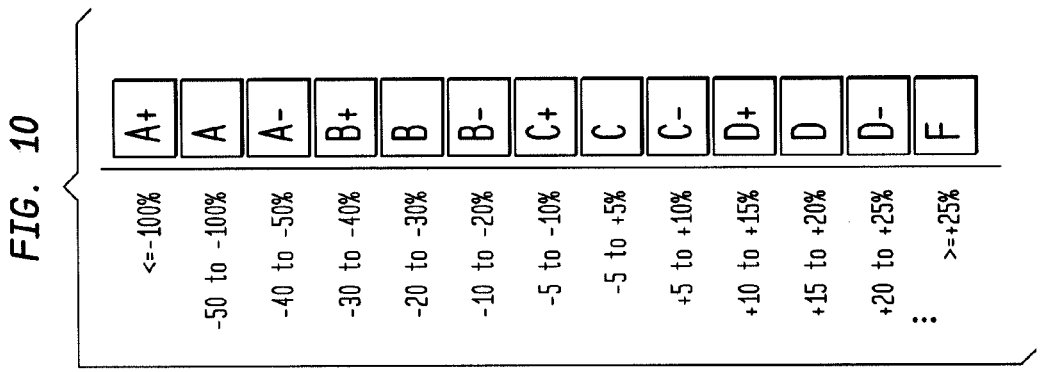
FIG. 10 is an exemplary grading scale for resource sustainability performance of a facility.
Figure 9A:
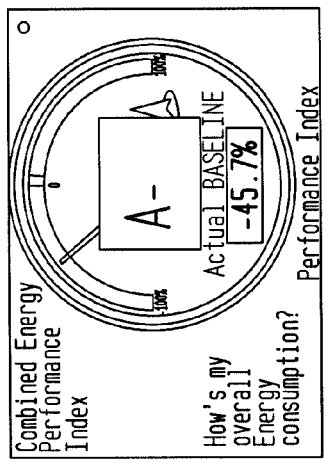
FIGS. 9A-9D are illustrations of exemplary displays of energy sustainability performance information for a facility, in accordance with an aspect of the present invention.
Figure 9B:
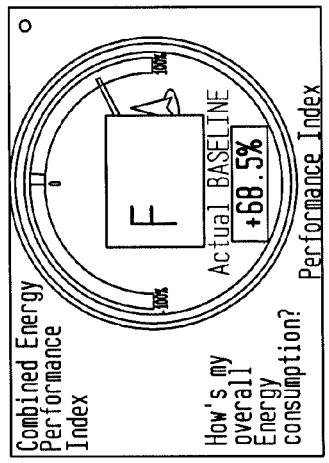
Figure 9C:
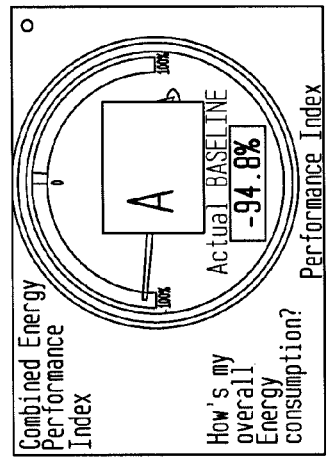
Figure 9D:
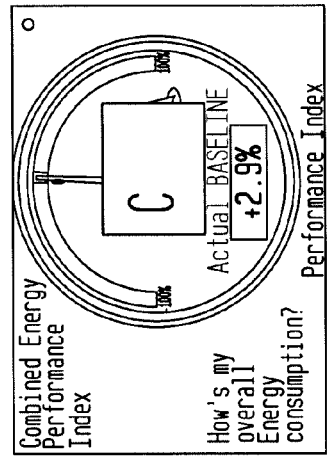

In a further embodiment, referring to FIGS. 9A-9D, the CEP values may be displayed with reference to grades A to F that indicate extent of success of the sustainability actions taken during the managing period for the facility. An exemplary grading scale that correlates CEP values to grades between A and F is shown in FIG. 10. The association of grades with CEP values for the facility may be useful for educating and communicating the results of sustainability actions taken to those involved in energy sustainability efforts for the facility.

Figure 11:
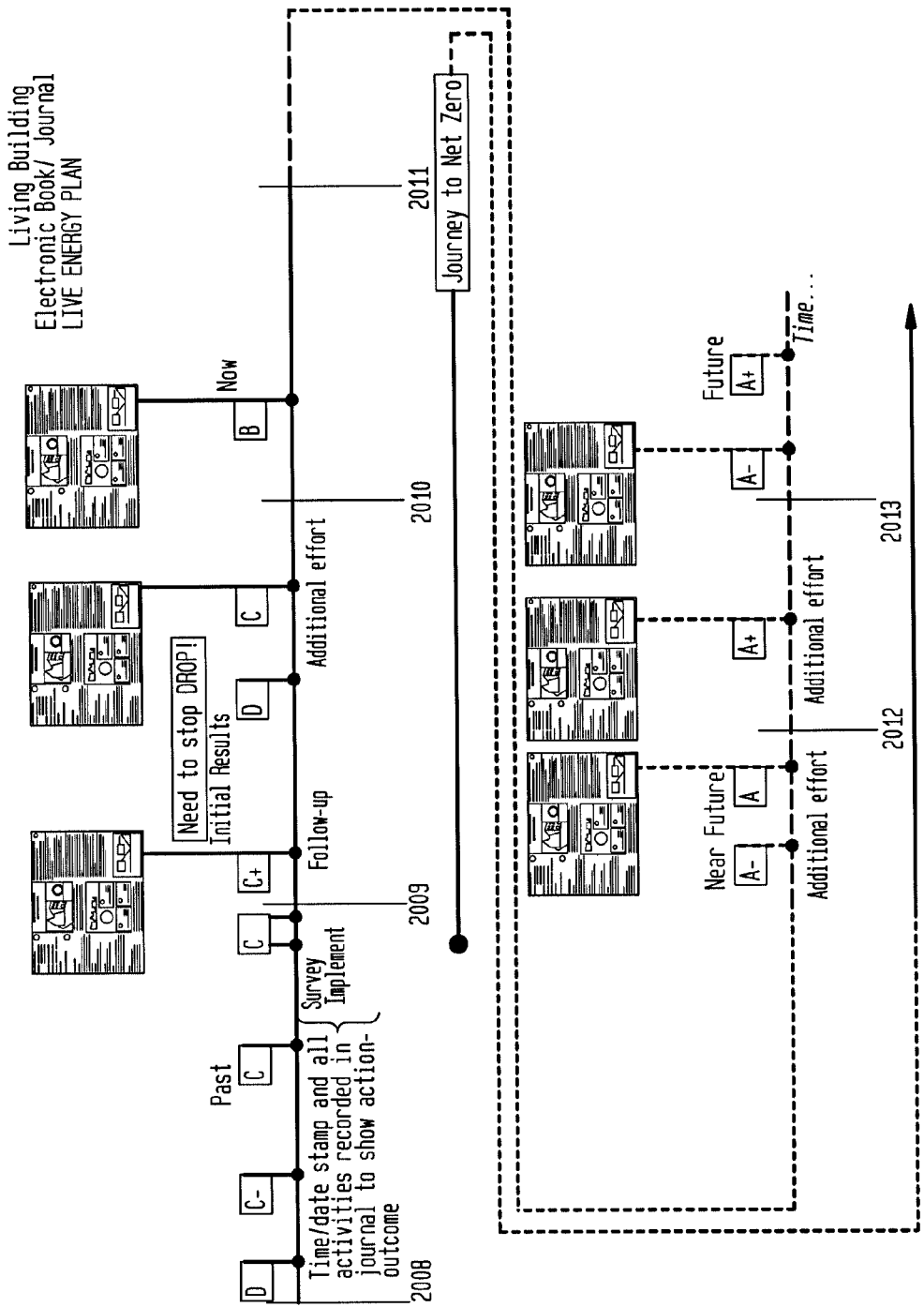
FIG. 11 is an illustration of an exemplary digital journal display including energy sustainability performance information for a facility, in accordance with an aspect of the present invention.

In another embodiment, referring to FIG. 11, the server 12 may provide that information relating to energy sustainability performance of the facility over time, which includes information entered at the clients 14, 16, CEP values determined during a management period, feedback information distributed, actions taken and results of actions, dashboard displays of CEP values and energy savings determinations, may be accessed at any time by the clients 14, 16 in real time over the communication network 20 and displayed in the form of an energy sustainability performance management time line. The clients 14, 16 may include an application or APP on their desktop, which is provided by the server 12, and, when executed, automatically displays the energy performance management time line on a monitor of the client. In addition, the APP may provide for display on the monitor of the client of a dashboard display having energy performance information corresponding to a selected date on the time line, based on a user clicking on the date on the time line, for example, using a cursor.

In an exemplary implementation of the process 300, a facility may be a school district that installs real time energy metering units which transmit real time energy usage information to the server 12 over the network 20. The server 12, based on historical energy usage information provided by the school district, may determine a baseline CEP value for a one year period, which provides context and meaning to the historical energy usage data. In addition, the server 12 may determine a CEP index, in relation to the baseline CEP value, and set a target CEP value for a managing period of one year to −100% or net zero energy operation. Individuals associated with the school district and responsible for energy sustainability efforts ("stakeholders") may, on the clients 14, 16, access the CEP values from a dashboard display provided by the server 12, and also receive sustainability feedback information that recommends actions to be taken and how to take actions to lower CEP values, in view of the current CEP value for the district. The stakeholders for the district, based on information on the dashboard display such as real time CEP values, may track progress toward net zero and take actions as energy use changes. Significantly, the actions may be taken before energy use can adversely impact the budget of the district. In addition, sustainability action result information and curated SRI generated by the server 12 may be shared with the stakeholders, such as via social network websites and knowledge databases maintained in an information storage device, such as found in libraries. The sharing of the curated SRI, for example, permits stakeholders and other individuals interested in energy sustainability efforts to increase their collective knowledge concerning energy sustainability. The sustainability actions taken at the district should have a high likelihood of success, because the feedback information that caused the actions to be taken was obtained from curated SRI. As energy consumption, and also the carbon footprint, of the district decreases based on the sustainability actions that are taken, new sustainability action result information is obtained and curated SRI is generated, and such information may be shared with stakeholders to continue to inform them of the actions taken and results of the actions.

Further, energy audits from a utility company obtained by the district may be entered in an electronic journal, such as using the client 14. The information in the audits may be used in sustainability feedback information that identifies opportunities, or particular sustainability actions, to be taken at the district to reduce energy consumption, such as by modifying operations and maintenance, and implementing energy conservation measures and renewable energy plans. In addition, information relating to renewable energy funding received from state or federal agencies, and energy sustainability proposals, reports or studies, and results of actions taken based on the proposals, reports or studies, may be entered into an electronic journal at the clients 14, 16. Further, the server 12 may track results of actions taken, compare the results against design expectations for the district and distribute information resulting from such a comparison. Thus, the server 12, in performing the inventive process of managing energy sustainability performance of the district, may help attain net zero energy operation for the district, through collaborative efforts with stakeholders and others interested in attaining energy sustainability.

In another exemplary embodiment, the process 300 may be implemented for an existing building that does not have any renewable energy sources and for which limited energy conservation and energy efficiency measures have been implemented. For this type of building, typically there is little or no management of energy usage, such that energy usage is expected to increase from one year to next. When the process 300 is implemented for the building, the CEP values likely would be determined to be in the range of 0% to +5% (Range 1), and in extreme cases in the range of +5% to +50% (Range 2). The conditions in the building that contribute to poor energy sustainability performance likely would be unknown. Consequently, the assistance of trained professionals likely would be required to improve CEP values quickly and to follow-up on the efforts taken.

When a stakeholder for the building is made aware that CEP values are high or increasing, such as from dashboard displays provided in accordance with the invention, the stakeholder may desire to cause a change, in other words, reduce the CEP value. Such desire is reflective of a natural, built-in human trait to try to reduce the CEP value ("move the meter") toward net zero energy operation. There may be many stakeholders involved in day to day and long term operations of the building. Each stakeholder may have a positive or negative impact on moving the meter. Historically, stakeholders have been unaware of their actions or inactions and their respective impacts, which may have caused the meter (CEP values) to move away from net zero energy operation.

In accordance with the present invention, stakeholders may be made continuously aware of the energy sustainability performance of the building, such as from an always accessible dashboard display including real time CEP values for the building. In addition, the feedback information may recommend the following sustainability actions when the CEP values are in the Ranges 1 or 2: keep windows and doors closed, turn lights off when not needed, adjust thermostat to energy efficient settings, minimize or eliminate additional electrical devices, use stairs instead of elevators, purchase energy efficient appliance, turn off computers, monitors, printers/copiers at night, report abnormal equipment operations, etc. As a result, it is expected that the CEP values may be caused to decrease from between +5 and +15% to between +0 to +5%, based on common sense actions and occupant behavior changes recommended in the sustainability feedback information. The real time CEP display permits stakeholders, who need to believe and see cause and effect relationship of their actions, to visualize such cause and effect of sustainability actions taken and continuously be aware of energy usage savings. In the absence of the availability of real time energy sustainability performance information, such as real time CEP values, the CEP values may change very quickly, such as in a matter of hours and days, such that progress towards energy sustainability may be lost. Thus, the real time CEP display of the present invention advantageously provides instant and easy to understand visual feedback to stakeholders, which in turn may cause CEP values to move towards net zero energy operation and also maintain CEP values at relatively low values for the life of the facility.

An objective for a building without renewable energy sources and for which limited energy conservation and energy efficiency measures have been implemented may be, at a minimum, to maintain CEP values in the Range 1. At these CEP values, if energy usage for the facility is maintained at or near the baseline energy usage value and increased energy usage is avoided, stakeholders may consider sustainability efforts to be successful.

In a further embodiment, assuming that the same building as previously described is determined to have CEP values in the Range 1, the inventive process may provide sustainability feedback information directed towards improving energy efficiencies in operations and maintenance energy efficiency, such as energy management controls. The actions desirably may be implemented without incurring additional costs or at relatively low cost, and have the objective of decreasing CEP values into the range of −10% to −5% (Range 3) and of −20% to −10% (Range 4). When CEP values are in the Range 1, and CEP values in the Ranges 3 or 4 are desired, the feedback information may include sustainability actions that typically require specialized knowledge, skills, equipment and tools, and access to spaces of a facility typically restricted to authorized persons. For example, the feedback information may recommend replacing air filters, lubricating moving parts, checking operating hours and startup and shutdown times of equipment, checking and adjusting set points and differentials, adjusting heating and cooling systems to operate in relation to each other instead of in opposition to each other, verifying that equipment is actually functioning properly and fine tuning and commissioning building controls. The objective of the actions recommended by the feedback information is to have mechanical and electrical equipment, systems and subsystems operate at energy efficiency levels of their original design specifications and as set forth in the building's operations and maintenance documents. The feedback information also may account for maximizing occupant comfort while reducing energy usage to provide that the lower CEP values, which are initially obtained, persist.

In still a further embodiment, assuming that the same building as described above is determined to have CEP values in the Range 4, the inventive process may provide feedback information to improve energy efficiencies that recommend actions relating to implementation of substantial capital improvements, and thus require the expenditure of not an insignificant amount of money. To execute such actions, consultants, architects/engineers, licensed contractors and trades may need to be utilized, and the time required to bid, fund, install, commission and operate the upgrades to capital equipment typically would take months and in some cases years. The objective of the feedback information when the CEP values are in the Ranges 3 or 4 is to replace existing, and install more or the most energy efficient, mechanical and electrical equipment, systems and subsystems at the facility, and ensure that the newly installed equipment operates at or beyond their original design capabilities. For example, equipment should be able operate at the capacity required to handle any energy load, while minimizing energy use at all times. The actions recommended in the feedback information when the CEP values are in the Range 4 may include installing new boilers, chillers, air conditioning systems, pumps, motors, windows, doors, insulation, lighting and lighting controls, and, after installation, verifying that equipment actually is functioning properly and fine tuning equipment operation, as may be needed.

In still a further embodiment, assuming that the same building as described in the above example is determined to have CEP values in the Range 5, the inventive process may provide feedback information to continue to reduce CEP values toward −100% by recommending actions related to providing renewable energy generation, which is a relatively high cost action. The objective of the feedback information provided when the CEP values are in the Range 5 is to cause installation at the facility of renewable energy systems, such as electrical, thermal, etc., to minimize and ultimately eliminate the reliance on fossil fuels, such as electricity supplied by utility companies and generated from fossil fuels. Similar to the replacement of equipment, the installation of renewable energy generation equipment requires use of consultants, architects, engineers, licensed contractors and trades, and typically takes months and in some cases years to fund, bid, install, commission and operate the installed renewable energy generation equipment. The sustainability actions included in the feedback information when CEP values are in the Range 5 may include installing solar photovoltaic, wind turbine, biomass, solar thermal and other renewable energy systems.

In still a further embodiment, the same building as described in the above example may not have a coordinated plan of actions to be taken to attain energy sustainability, and stakeholders associated with the building may be taking various actions, such as those described above for the various CEP Ranges, to attain energy sustainability. In such circumstances, the CEP values for the building may be anywhere between −100% to 100%. According to an embodiment of the invention, in such circumstances feedback information may recommend installation of renewable energy systems before energy efficiency projects are implemented. In addition, information on sustainability actions taken, which have been entered in a digital journal at the client 14, may be distributed to social networking sites or to mobile clients 16 operated by technicians of the facility. The distribution may be effected in the form of emails or energy usage meter alerts transmitted to the client 16 when CEP values change by a predetermined amount, enter a different predetermined CEP range or remain at a new value in a predetermined CEP range for a predetermined time. The distribution of such information may alert stakeholders of a change in energy sustainability performance, and whether the change is connected to actions taken or lack of action.

In still a further embodiment, the inventive managing process may be implemented for a facility to be constructed using a net zero energy performance design. A net zero design, however, will not necessarily result in the facility actually performing as designed in accordance with its numerous energy efficiency and renewable energy features. According to the construction plan, activities by numerous stakeholders would be coordinated by a construction manager, architect or engineer that will impact operations for all CEP values. The invention advantageously may be implemented to manage energy sustainability performance during and after completion of construction of the net zero design facility. The objective of the actions included in feedback information determined for the facility is to minimize energy consumption, maximize renewable energy production and have all systems and subsystems working together, such that the use of fossil fuels may be minimized and ultimately eliminated.

In another embodiment, when CEP values for a facility are equal to or exceed −100%, the feedback information may recommend sustainability actions that account for uncontrollable environmental factors, such as weather. For example, although a facility may decrease overall energy consumption from one year to the next, weather during a particular year may impact the generation of renewable energy, such as solar energy generation. In such circumstances, when CEP values are about −100%, the server 12 may retrieve information on expected weather conditions, and the feedback information may recommend further energy efficiency actions, such as raising thermostat levels an additional amount during certain days in the summer, in anticipation of time periods during which solar energy generation will not be at the same levels as expected or as in previous years.

Figure 12:
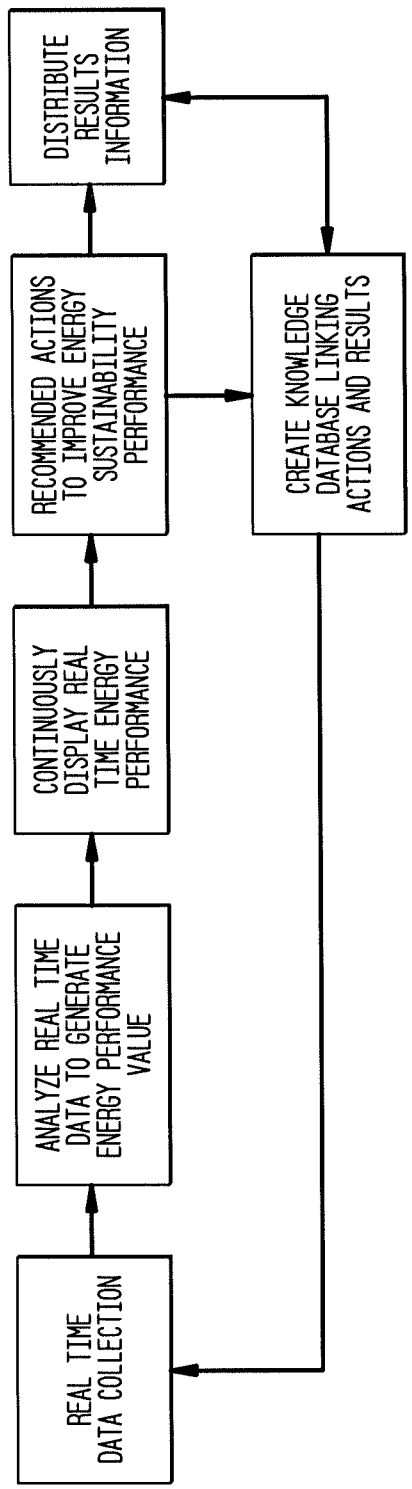
FIG. 12 is a block diagram of an exemplary closed loop system for attaining energy sustainability for a facility, in accordance with an aspect of the invention.

Thus, the managing of energy sustainability performance of a facility, in accordance with an aspect of the present invention, implements a closed loop system for reducing energy consumption at the facility, as shown in FIG. 12. Referring to FIG. 12, monitoring information is collected in real time and then analyzed to determine real time energy sustainability performance for the facility. The real time energy performance (CEP values) is determined in relation to an energy performance baseline for the facility, which is determined from historical energy consumption data for the facility. The real time energy performance of the facility, which is continuously determined, is continuously distributed and made available for display. Feedback information to be distributed to distribution targets associated with the facility in real time is determined based on curated RSI, real time information of results of any action taken to improve energy efficiency and renewable energy generation at the facility, and monitored energy information for the facility and facility operating and environmental conditions. Information indicating the success of sustainability actions taken for the facility is also distributed and made available for access in real time. Consequently, increased and real time awareness may be achieved concerning the actions that cause the CEP value for the facility to decrease. Also, collaborative efforts to attain energy sustainability may be fostered, based on distribution of feedback information and sustainability action results information to multiple distribution targets.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for managing resource sustainability performance of a facility comprising:
   receiving, over a communication network, real time monitoring data for the facility, wherein the monitoring data includes real time resource monitoring data and facility operations monitoring data;
   determining, by a processor unit, a target resource usage value for the facility for a predetermined first time period during which resource sustainability performance of the facility is determined in relation to a baseline resource usage value for the facility for a predetermined second time period prior to the predetermined first time period using resource usage information for the facility having a timing during the predetermined first time period;
   providing, by the processor unit, display data for displaying a real time combined resource sustainability performance value for the facility in relation to a combined resource sustainability performance index for the facility, wherein the combined resource sustainability performance index is determined using information on resource consumption for the facility from a plurality of different sources of resources for the facility and wherein the real time combined resource sustainability performance value for the facility is determined in relation to the baseline resource usage value and using the real time monitoring data having a time during the predetermined first time period; and
   providing, by the processor unit, real time resource sustainability feedback information to cause a resource sustainability action to be executed in connection with the facility, wherein the real time resource sustainability feedback information is determined from resource sustainability result information, wherein the resource sustainability result information is determined from real time resource sustainability action information and the real time resource performance value for the facility.

2. The method of claim 1, wherein the resource is energy and the resource sustainability action information includes at least one of an action taken to control operation of an energy consuming appliance of the facility, an action taken in connection with an energy generator of or for the facility, and an action taken to reduce consumption of energy by the facility other than by control of operation of an energy consuming appliance of the facility.

3. The method of claim 2, wherein the energy generator is a renewable energy generator.

4. The method of claim 1 further comprising:
   determining the resource sustainability feedback information based on characteristics information of a distribution target to which the resource sustainability feedback information is provided.

5. The method of claim 4, wherein the distribution target includes at least one of (i) a server providing a social networking website; (ii) a database of resource sustainability information; (iii) an individual or entity responsible for operation and maintenance of resource consumption appliances of the facility; (iv) an individual or entity responsible for generation of a renewable resource for the facility; and (v) an individual or entity responsible for proposing or implementing a resource sustainability plan for the facility.

6. The method of claim 1 further comprising:
   updating in real time the real time combined resource sustainability performance value for the facility, and associating the resource sustainability result information and the updated real time combined resource sustainability performance value with the resource sustainability action executed responsive to the resource sustainability feedback information.

7. The method of claim 1 further comprising:
   receiving, in real time over the communication network, data indicating execution of the resource sustainability action information for the facility.

8. The method of claim 1 further comprising:
   providing for communication, in real time over the communication network, of the resource sustainability result information and information indicating a connection between the resource sustainability action executed responsive to the resource feedback information and a change in the real time combined resource sustainability performance value for the facility.

9. The method of claim 1 further comprising:
   determining, by the processor unit, whether a resource sustainability result for the facility satisfies a predetermined criteria using the real time resource sustainability action information and the real time combined resource sustainability performance value for the facility.

10. The method of claim 9, wherein the predetermined criteria is a change in the real time combined resource sustainability performance value by at least a predetermined amount over a predetermined period.

11. The method of claim 1, wherein the resource is energy, the method further comprising:
determining, using energy sustainability action result information for the facility, an energy sustainability action executed to cause a predetermined change in a real time combined energy sustainability performance value when a determined real time combined energy sustainability performance value for the facility is within a predetermined range.

12. The method of claim 11 further comprising:
distributing in real time over the communication network information indicating the energy sustainability action determined to cause the predetermined change in the real time combined energy sustainability performance value when the determined real time combined energy performance value is within the predetermined range.

13. The method of claim 12, wherein the distributing of the information indicating the determined energy sustainability action is to at least one of a server providing a social networking website and a server for storing data associated with energy sustainability.

14. The method of claim 1 further comprising;
storing in a storage medium information relating to resource sustainability of the facility and providing real time access to the stored information over the communication network.

15. The method of claim 1, wherein a resource sustainability action for the facility is automatically executed responsive to the providing of the resource sustainability feedback information.

16. The method of claim 1, wherein the resource is energy or water.

17. The method of claim 1, wherein the index has a range of values in which a value at one end of the range corresponds to a condition where over the course of the predetermined first period the resource sustainability performance of the plurality of the different sources of resources of the facility is net zero.

18. An apparatus for managing resource sustainability performance of a facility comprising:
receiver unit to receive, over a communication network, real time monitoring data for the facility, wherein the monitoring data includes real time resource monitoring data and facility operations monitoring data; and
a resource sustainability unit adapted to determine a target resource usage value for the facility for a predetermined first time period during which resource sustainability performance of the facility is determined in relation to a baseline resource usage value for the facility for a predetermined second time period prior to the predetermined first time period using resource usage information for the facility; to provide display data for displaying a real time combined resource sustainability performance value for the facility in relation to a combined resource sustainability performance index for the facility, wherein the combined resource sustainability performance index is determined using information on resource consumption for the facility from a plurality of different sources of resources for the facility and wherein the real time combined resource sustainability performance value for the facility is determined in relation to the baseline resource usage value and using the real time monitoring data having a time during the predetermined first time period; and to provide real time resource sustainability feedback information indicating a resource sustainability action for the facility, wherein the real time resource sustainability feedback information is determined from resource sustainability result information, wherein the resource sustainability result information is determined from real time resource sustainability action information and the real time resource performance value for the facility.

19. The apparatus of claim 18, wherein the resource is energy and the resource sustainability action information includes at least one of an action taken to control operation of an energy consuming appliance of the facility, an action taken in connection with an energy generator of or for the facility, and an action taken to reduce consumption of energy by the facility other than by control of operation of an energy consuming appliance of the facility.

20. The apparatus of claim 19, wherein the energy generator is a renewable energy generator.

21. The apparatus of claim 18, wherein the resource sustainability unit is adapted to determine the resource sustainability feedback information based on characteristics information of a distribution target to which the resource sustainability feedback information is provided.

22. The apparatus of claim 21, wherein the distribution target includes at least one of (i) a server providing a social networking website; (ii) a database of resource sustainability information; (iii) an individual or entity responsible for operation and maintenance of resource consumption appliances of the facility; (iv) an individual or entity responsible for generation of a renewable resource for the facility; and (v) an individual or entity responsible for proposing or implementing a resource sustainability plan for the facility.

23. The apparatus of claim 18, wherein the resource sustainability unit is adapted to update in real time the real time combined resource sustainability performance value for the facility, and associate the resource sustainability result information and the updated real time combined resource sustainability performance value with the resource sustainability action executed responsive to the resource sustainability feedback information.

24. The apparatus of claim 18, wherein the receiver is adapted to receive, over the communication network, real time data indicating execution of the resource sustainability action information for the facility.

25. The apparatus of claim 18, wherein the resource sustainability unit is adapted to provide for communication, in real time over the communication network, of the resource sustainability result information and information indicating a connection between the resource sustainability action executed responsive to the resource feedback information and a change in the real time combined resource sustainability performance value for the facility.

26. The apparatus of claim 18, wherein the resource sustainability unit is adapted to determine whether a resource sustainability result for the facility satisfies a predetermined criteria using the real time resource sustainability action information and the real time combined resource sustainability performance value for the facility.

27. The apparatus of claim 26, wherein the predetermined criteria is a change in the real time combined resource sustainability performance value by at least a predetermined amount over a predetermined period.

28. The apparatus of claim 18, wherein the resource is energy, and the resource sustainability unit is adapted to determine, using energy sustainability action result information for the facility, an energy sustainability action executed to cause a predetermined change in a real time combined energy sustainability performance value when a determined real time combined energy sustainability performance value for the facility is within a predetermined range.

29. The apparatus of claim 28, wherein the resource sustainability unit is adapted to distribute in real time over the communication network information indicating the energy sustainability action determined to cause the predetermined change in the real time combined energy sustainability performance value when the determined real time combined energy sustainability performance value is within the predetermined range.

30. The apparatus of claim 29, wherein the information indicating the determined energy sustainability action is distributed to at least one of a server providing a social networking website and a server for storing data associated with energy sustainability.

31. The apparatus of claim 18 further comprising;

a storage medium to store information relating to resource sustainability of the facility.

32. The apparatus of claim 18, wherein a resource sustainability action for the facility is automatically executed responsive to the resource sustainability feedback information.

33. The apparatus of claim 18, wherein the resource is energy or water.

34. The apparatus of claim 18, wherein the index has a range of values in which a value at one end of the range corresponds to a condition where over the course of the predetermined first period the resource sustainability performance of the plurality of the different sources of resources of the facility is net zero.

* * * * *